(12) United States Patent
Bernacki et al.

(10) Patent No.: US 8,710,441 B2
(45) Date of Patent: Apr. 29, 2014

(54) PASSIVE MILLIMETER WAVE DIFFERENTIAL INTERFERENCE CONTRAST POLARIMETRY

(75) Inventors: Bruce E. Bernacki, Kennewick, WA (US); James F. Kelly, Pasco, WA (US); David M. Sheen, Richland, WA (US); Jonathan R. Tedeschi, Richland, WA (US); Thomas E. Hall, Kennewick, WA (US); Brian K. Hatchell, West Richland, WA (US); Patrick Valdez, Pasco, WA (US); Douglas L. McMakin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 222 days.

(21) Appl. No.: 13/410,923

(22) Filed: Mar. 2, 2012

(65) Prior Publication Data

US 2013/0229302 A1 Sep. 5, 2013

(51) Int. Cl.
*G01J 5/00* (2006.01)
(52) U.S. Cl.
USPC ........................................ 250/338.1

(58) Field of Classification Search
USPC ............. 250/334, 338.1, 341.1, 341.3, 341.8; 342/22, 179
See application file for complete search history.

(56) References Cited

U.S. PATENT DOCUMENTS 7,221,139 B2 * 5/2007 Ammar ..................... 324/76.14

OTHER PUBLICATIONS

Wikner et al., "Polarimetric Passive Millimeter-wave Sensing," Proc. SPIE 4373, (2008).

* cited by examiner

*Primary Examiner* — Mark R Gaworecki
(74) *Attorney, Agent, or Firm* — Klarquist Sparkman, LLP (57) ABSTRACT

Differential polarization imaging systems include an axicon configured to provide a displacement of ray bundles associated with different image patches. The displaced ray bundles are directed to antenna horns and orthomode transducers so as to provide outputs correspond to orthogonal linear states of polarization (SOPs). The outputs are directed to a differential radiometer so that Stokes parameter differences between image patches can be obtained. The ray bundle displacements can be selected to correspond to a mechanical spacing of antenna horns. In some examples, ray bundle displacement corresponds to a displacement less than the diffraction limit.

32 Claims, 12 Drawing Sheets

PASSIVE MILLIMETER WAVE DIFFERENTIAL INTERFERENCE CONTRAST POLARIMETRY

ACKNOWLEDGMENT OF GOVERNMENT SUPPORT

This invention was made with government support under contract number DE-AC05-76RL01839 awarded by the U.S. Department of Energy, Office of Nonproliferation Research (NA-22). The government has certain rights in the invention.

FIELD

The disclosure pertains to millimeter wave imaging systems.

BACKGROUND

Passive millimeter-wave imaging provides the capability to image through dust, fog, smoke, clothing and other obscurants during daytime/nighttime operation. One approach to imaging with millimeter waves is achieved by scanning a detector assembly or radiometer with respect to a scene of interest in order to build up an image point by point. Image resolution is typically substantially less than that achievable with visible imaging systems due to the much longer wavelength of operation. In addition, important features of many scenes often exhibit low contrast, and are not readily apparent in millimeter wave imaging.

SUMMARY

Millimeter wave polarimetric sensing can enhance the sensitivity of passive millimeter wave imaging due to its ability to highlight the presence of anisotropic (and often man-made) objects present in a scene. Imaging methods and apparatus are described below which, in some examples, combine a differential heterodyne radiometer and a quasi-optical element to provide a differential phase contrast image to further highlight image anomalies. In some examples disclosed herein, millimeter wave systems can provide improved contrast even for features having dimensions smaller than a diffraction limit. In some examples, polarimetric sensing can enhance the sensitivity of passive millimeter wave imaging due to its ability to highlight the presence of anisotropic (and often man-made) objects in a scene. Imaging methods are described which combine a differential heterodyne radiometer and a quasi-optical element to provide a differential phase contrast image to highlight image anomalies.

In some examples, apparatus include an imaging element situated on an axis and configured to produce an image having at least a first image patch and a second image patch based on a first object patch and a second object patch, respectively. A first antenna and a second antenna are situated along the axis to receive radiation associated with the first image patch and the second image patch, respectively. Typically one or both of the first antenna and the second antenna are displaced from the axis. A radiometer is coupled to the first antenna and the second antenna and configured to provide an output signal based on at least one polarization difference between the radiation associated with the first image patch and the second image patch. In some examples, a memory is configured to store at least one polarization difference associated with a plurality of first and second image patches so as to define an at least one dimensional image. In further examples, a shear element is configured to displace the radiation associated with the first image patch and the radiation associated with the second image patch with respect to the axis. In other representative examples, the shear element is configured to provide the displacement of the radiation associated with the first image patch and the radiation associated with the second image patch based on an imaging element diffraction limit. In other embodiments, the displacement of the radiation associated with the first image patch and the radiation associated with the second image patch is based on a separation of the first antenna and the second antenna, and the shear element is an axicon. In some examples, the first and second antennas are horns and are situated along parallel or non-parallel offset axes. In some examples, the shear element is an axicon having a surface of rotation configured to increase or decrease a displacement of the first and second image patches with respect to the axis so as to correspond to an antenna separation. In typical examples, the polarization difference is associated with at least one linear state of polarization, at least one circular state of polarization, or any combination of Stokes parameters or any single Stokes parameter. In some disclosed examples, the imaging element is associated with an aperture stop having an effective diameter D, the radiometer is responsive to radiation at a wave length $\lambda$, and the first object patch and the second object patch have an angular separation of less than about $1.5\,\lambda/D$.

Methods comprise receiving a first radiation flux from a first object patch and a second radiation flux from a second object patch. The first radiation flux and the second radiation flux are directed along first and second axes to first and second antennas, respectively. Based on the radiation fluxes received at the first and second antennas, at least one polarization difference between the first object patch and the second object patch is determined. In some examples, the first object patch and the second object patch have an angular separation that is less than or equal to an effective diffraction limited angular separation. In representative examples, the displacement is associated with an increased or decreased separation of the first radiation flux and the second radiation flux. In typical embodiments, at least one polarization difference is associated with a difference between one or more Stokes parameters associated the object patches. In some examples, an image is formed based on polarization differences associated with a plurality of object patches.

In other examples, millimeter wave imaging systems comprise a mirror defining an aperture stop of diameter D and situated so as to form an image of an object. An axicon is situated to displace first and second image portions of the image formed by the mirror. Antennas are situated to receive radiation portions associated with respective displaced image portions. A radiometer is coupled to the antennas and configured to produce an output corresponding to a polarization difference such as difference based on Stokes parameters between the image portions.

In still further examples, methods include obtaining image patches associated with first and second object patches and adjusting an image patch separation so as to conform to an antenna spacing. Radiation associated with the first and second image patches is directed to a first and a second antenna, respectively. Based on the directed radiation, at least one polarization difference between the first image patch and the second image patch is determined. In some embodiments, the image patch separation corresponds to a diffraction limit. In other examples, the optical radiation is at a wavelength $\lambda$, the object patches are imaged with an imaging element having an effective diameter D, and an angular separation of the first and second object patches with respect to the imaging element is less than $1.2\,\lambda/D$. In further representative examples, radiation from the first image patch and the second image patch is detected with a differential radiometer. In some examples, the at least one polarization difference is based on frequency downconverted electrical signals associated with the radiation from the first image patch and the second image patch.

The foregoing and other features and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

As used herein, radiation or optical radiation refers to electromagnetic radiation in a wavelength range of from about 200 nm to 100 mm. In some examples, systems and methods are described with reference to millimeter waves, defined herein as radiation at wavelengths between about 0.5 mm and 10 mm. For example, passive millimeter wave (MMW) imaging can be used to measure the apparent temperature of an object (a so-called "brightness temperature") using W-band radiation at 94 GHz and a wavelength of 3.2 mm so as to image through dust, fog, dry sand, and clothing during daytime/nighttime operation.

Optical systems are described herein with reference to an optical axis that generally extends thru a center of one or more optical elements, an entrance pupil, or an exit pupil. Such as axis generally includes one or more straight line portions that can be bent, folded, or otherwise redirected by one or more optical elements such as lenses, mirrors, and prisms. States of polarization are described with reference to orthogonal coordinate axes in which a z-axis corresponds to a propagation direction, and x- and y-axes correspond to horizontal (H) and vertical (V) linear states of polarization (SOPs). In addition, some examples described with reference to millimeter wave imaging at frequencies of 80-120 GHz, 90-100 GHz, 91-95 GHz or other frequency ranges, but in other examples, frequency ranges about frequencies corresponding to wavelengths between about 0.2 µm and 20 mm can be used.

Imaging system angular resolution as a function of aperture stop diameter D is approximately $\lambda/D$. For example, at a wavelength $\lambda=3.2$ mm and an antenna diameter D=500 mm, angular resolution is about 6.4 milliradians. Object patches having smaller angular separations can produce images with useful features, effectively improving imaging resolution based on polarization sensitive detection. As used herein, diffracted limited object patch separations are object patch angular separations that are less than or equal to 2.0, 1.0, 0.8, 0.5, or 0.1 λ/D. In some disclosed examples, radiation from a first and a second object patches (i.e., portions of a field of view being imaged or otherwise detected) is directed to first and second antennas or detectors, respectively. The separation of radiation from the object patches need not be complete, so long as the first and second antennas preferentially receive radiation from the associated object patches, even in the presence of radiation from other object patches.

A fully-polarimetric MMW imager or imager at other wavelengths can detect the states of polarization (SOPs) of detected radiation. Typically, a MMW radiometer can provide outputs corresponding to intensities (I) of components of detected radiation associated with a horizontal SOP ($T_H$), a vertical SOP ($T_V$), linear polarizations at +45° and −45° ($T_{+45}$ and $T_{-45}$, respectively and referred to as diagonal and anti-diagonal SOPs), and right- and left-handed circular SOPs ($T_r$ and $T_l$, respectively). Stokes parameters I, Q, U, and V correspond to arithmetic combinations of these six intensities:

$$\begin{pmatrix} I \\ Q \\ U \\ V \end{pmatrix} = \begin{pmatrix} \langle E_H^2 \rangle + \langle E_V^2 \rangle \\ \langle E_H^2 \rangle - \langle E_V^2 \rangle \\ 2\mathrm{Re}\langle E_V E_H^* \rangle \\ 2\mathrm{Im}\langle E_V E_H^* \rangle \end{pmatrix} = \begin{pmatrix} T_H + T_V \\ T_H - T_V \\ T_{+45} - T_{-45} \\ T_r - T_l \end{pmatrix},$$

wherein E refers to electric field amplitude, and Re and Im refer to real and imaginary parts, and the brackets denote a time average. The intensities ("temperatures") T can be obtained using various polarization sensitive optical elements. In the disclosed examples, millimeter wave radiometers are configured to provide signals associated with SOP differences between two object patches as described in further detail below.

Figure 1:
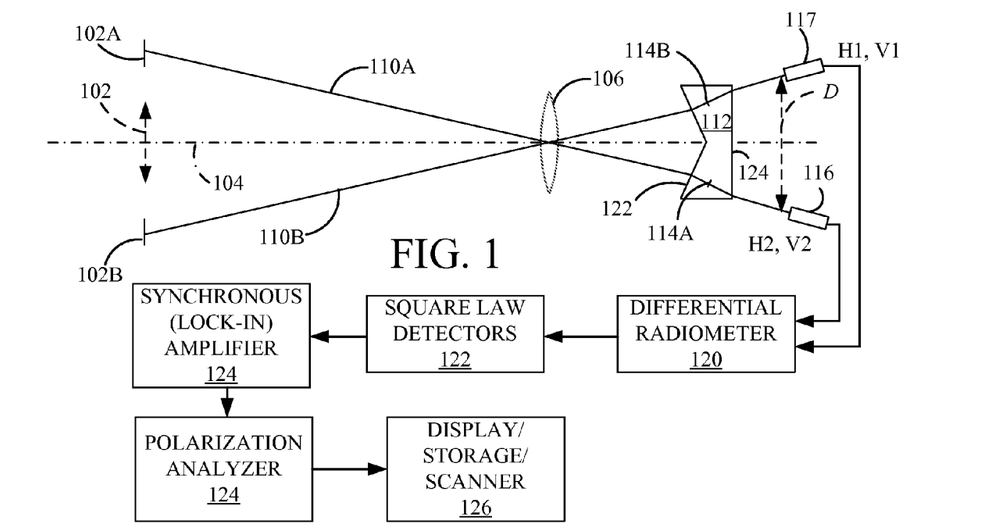
FIG. 1 is a schematic diagram of a portion of a millimeter wave (MMW) imaging system that includes an axicon.

A portion of a representative millimeter wave imaging system 100 is illustrated in FIG. 1. As shown in FIG. 1, an object plane 102 that includes object patches 102A, 102B associated with a portion of a field of view to be imaged is situated along axis 104. Radiation from the object plane 102 can be received by a focusing element 106 that is also situated on the axis 104. For purposes of illustration, the focusing element 106 is shown as a single element spherical lens, but other reflective, refractive, or diffractive optical elements or combinations thereof can be used. For example, reflective optical elements such as spherical, ellipsoidal, parabolic or generally aspheric reflectors can be used. FIG. 1 shows ray paths 110A, 110B that are associated with radiation propagation from a central portion of the object patches 102A, 102B, respectively, through the center of the focusing element 106. The object patches 102A, 102B are shown as non-overlapping, but partially overlapping object patches can be imaged as well and are typically preferred in detecting the change in the polarization properties of a MMW image. As used herein, a central ray is defined as ray path from an object or object path passing through the center of a focusing element, a center of an entrance pupil, an exit pupil, or an aperture stop. In FIG. 1, only the central rays 110A, 110B are shown, and other radiation propagation directions are omitted for clarity.

An axicon 112 is situated on the axis 104 is situated so as to deviate the central rays 110A, 110B so that image patches 114A, 114E are formed. Image patches can be formed on the object side of the axicon 112 ("object-wise"), within the axicon 112, or beyond the axicon 122 ("image-wise"). The image patches 114A, 114E are further displaced from the axis 104 by the axicon 112, and radiation from the image patches 114A, 114B propagates to orthomode transducers 116, 117 that are coupled to a differential radiometer 120 for processing as described in further detail below. Each of the orthomode transducers 116, 117 couples electrical signals corresponding to orthogonal linear SOPs. For convenient illustration, the orthomode transducers 116, 117 are shown in FIG. 1 as coupling polarization components H1, V1 and H2, V2, respectively to the differential radiometer 120. The axicon 112 of FIG. 1 has a conical surface of rotation 122 and planar surface 124 configured so that the image patches 114A, 114B are displaced so as to correspond to a separation D of the detectors 116, 117. The axicon 112 can be made of any suitable material that is transmissive at the wavelengths of interest. Example materials include cross-linked polystyrene such as REXOLITE microwave plastic, TEFLON polytetrafluoroethylene, perfluoroalkoxy polymer resin, or fluorinated ethylene propylene, or other materials.

Imaging systems such as the system 100 of FIG. 1 are generally configured to scan an object space and build images one or a few pixels at a time, especially at millimeter wavelengths at which array detectors tend to be expensive, difficult to operate, and generally unavailable for general sale. Scanning generally is associated with scanning the axis 104 through a suitable portion of object space, typically in a raster pattern. This can be accomplished by suitable motion of the imaging system or portions thereof. Acquired data from each point of each scan line can then be used to produce an image.

The differential radiometer 120 is generally coupled to one or more square law detectors 122, typically one detector for each of horizontal, vertical, diagonal, anti-diagonal, right-handed, and left-handed SOPs. The detectors 122 are coupled to an amplifier 124 and to a polarization analyzer 124. A display or memory 126 is configured to display or store image data associated with one or more Stokes parameters.

Figure 2A:
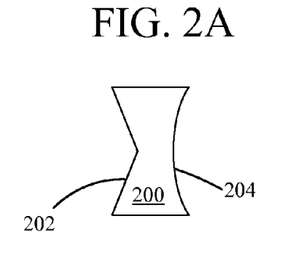
FIGS. 2A-2C illustrate representative refractive axicons for use in differential polarization imaging.
Figure 2B:
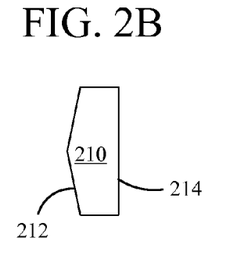
Figure 2C:
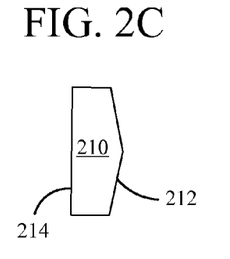

FIGS. 2A-2E illustrate representative alternative refractive axicon configurations. For convenience, these examples are illustrated situated so that the surfaces on the left hand side of the drawing are object-wise surfaces, but it will be apparent that these can be arranged otherwise. Referring to FIG. 2A, an axicon 200 includes a concave conical surface 202 and a concave spherical surface 204. FIG. 2B illustrates an axicon 210 that includes a convex conical surface 212 and a planar surface 214. The surface 212 tends to reduce image patch separation when used in system such as that of FIG. 1. The axicon 210 is shown reversed in FIG. 2C so as to increase image patch separation.

Figure 3A:
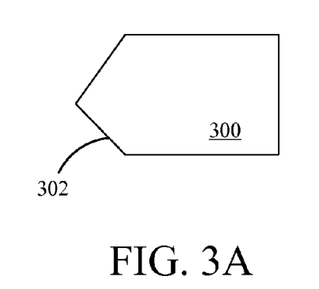
FIGS. 3A-3B illustrate representative reflective axicons for use in differential polarization imaging.
Figure 3B:
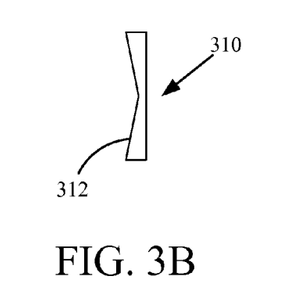

FIGS. 3A-3B illustrate representative reflective axicons. In FIG. 3A, an axicon 300 includes a conical convex reflective surface 302 that can be a metallic or other reflective surface. FIG. 3B illustrates an axicon 310 that includes a concave reflective surface 312. The reflective surfaces 302, 312 are typically conical, but curved shapes such as spherical, elliptical, parabolic, or other curved or flat surfaces or surface portions can be used.

Figure 4:
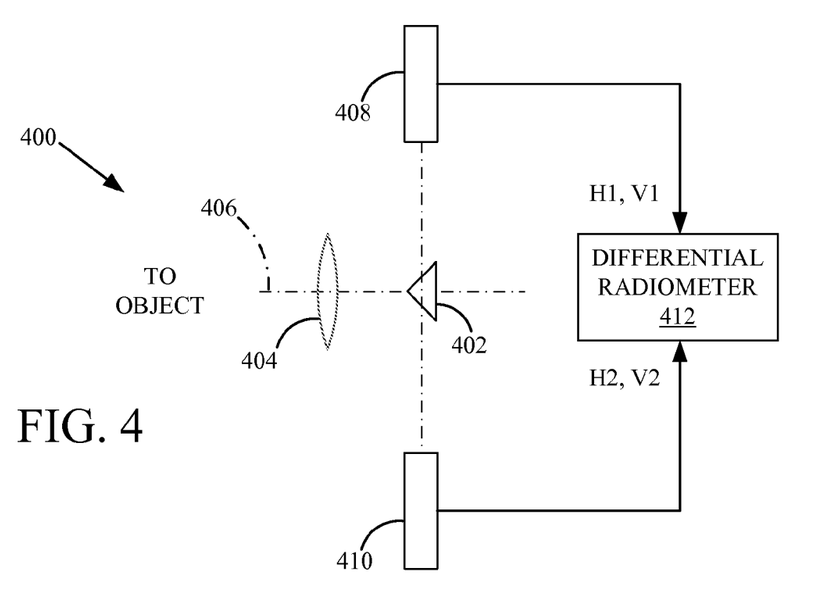
FIG. 4 is a schematic diagram illustrating a portion of a millimeter wave imaging system having facing antenna horns.

A portion of an imaging system 400 that includes a reflective axicon 402 is illustrated in FIG. 4. An imaging element 404 is situated along an axis 406 so as to form images of overlapping or non-overlapping object patches at antennas 408, 410 that are coupled to a differential radiometer 412. The antennas 408, 410 are spaced apart sufficiently so as to permit placemen to the axicon 402 between them. The axicon 402 can be a solid substrate with a metallic or other reflective coating.

Figure 5:
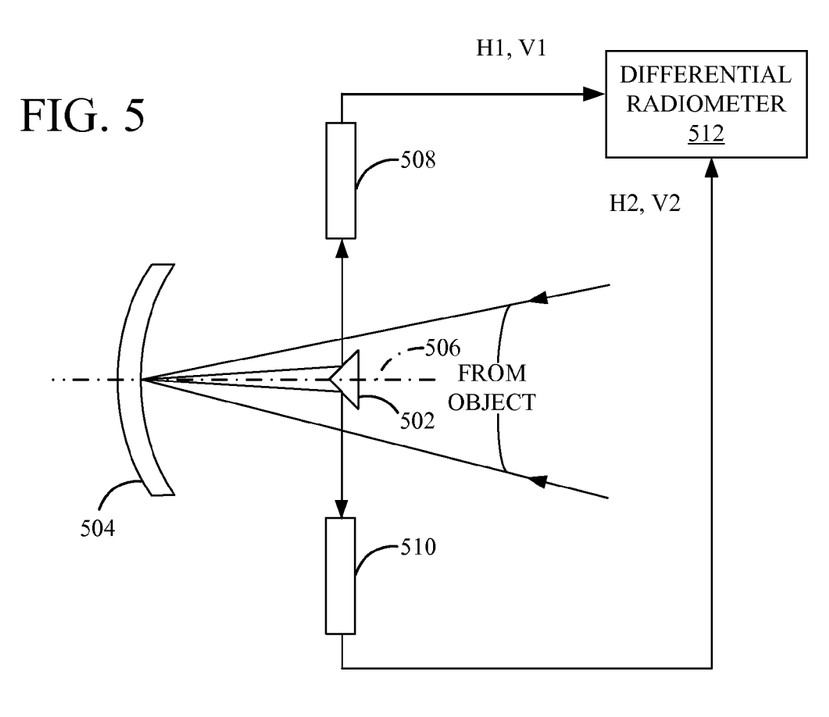
FIG. 5 is a schematic diagram of a portion of a millimeter wave imaging system that includes reflective imaging element.

A portion of an alternative imaging system 500 that includes a reflective axicon 502 and a reflective imaging element 504 is illustrated in FIG. 5. The imaging element 504 is situated along an axis 506 so as to form images of overlapping or non-overlapping object patches at antennas 508, 510 that are coupled to a differential radiometer 512. The antennas 508, 510 are spaced apart sufficiently so as to permit placement to the axicon 502 between them and are shown as facing each other, but arrangements in which the antennas are offset or face different directions can be used. The axicon 502 can be a solid substrate with a metallic or other reflective coating.

Figure 6:
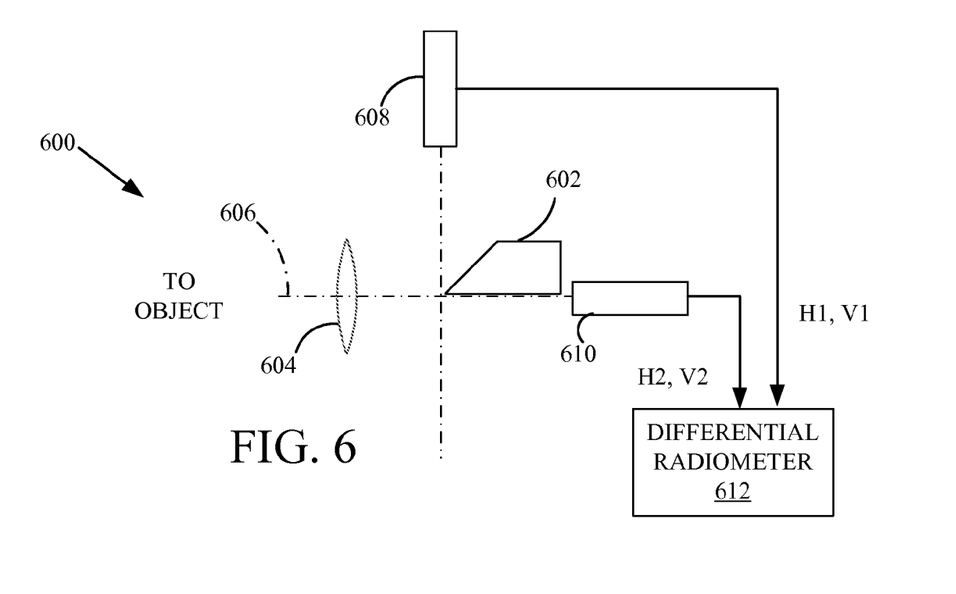
FIG. 6 is a schematic diagram of a millimeter wave imaging system.

A portion of an imaging system 600 that includes a truncated reflective axicon 602 is illustrated in FIG. 6. An imaging element 604 is situated along an axis 606 so as to form images of overlapping or non-overlapping object patches at antennas 608, 610 that are coupled to a differential radiometer 612. The antennas 608, 610 are spaced along orthogonal extensions of the axis 606.

In the above examples, surfaces of revolution were used. In other examples, simple prisms such as right angle or other prisms can be used, or two planar mirrors can be provided to deviate radiation associated with different object patches. In further examples, transmissive or reflective diffractive or holographic devices can be used.

Figure 7:
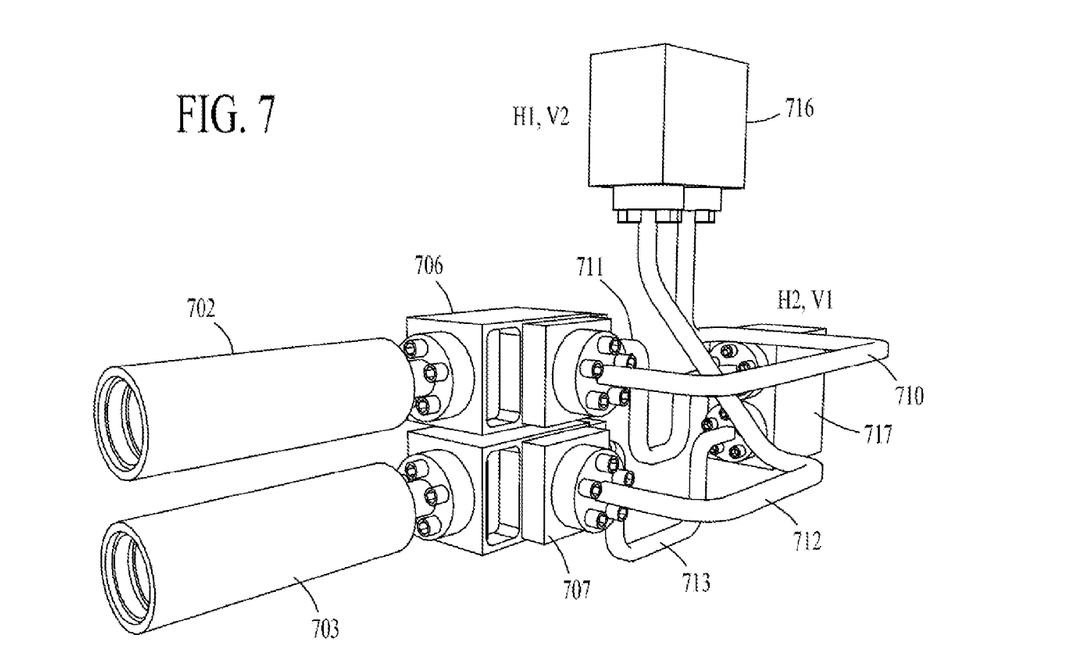
FIG. 7 is a perspective view of a portion of a millimeter wave imaging system.

FIG. 7 is a perspective view of a portion of a representative imaging system. As shown in FIG. 7, millimeter wave antenna horns 702, 703 are coupled to respective orthomode transducers (OMTs) 706, 707. Orthogonal polarization components from the OMT 706 are coupled via waveguides 710, 711 to respective low noise amplifiers 716, 717. Similarly, orthogonal polarization components from the OMT 707 are coupled via waveguides 712, 713 to the low noise amplifiers (LNAs) 716, 717, respectively. For purposes of illustration, a vertical (V) polarization component is transmitted by the OMTs 706, 707 and a horizontal (H) component is output at a 90 degree angle with respect to the V polarization component. Thus, a vertical component from OMT 706 (V1) and a horizontal component from OMT 707 (H2) are coupled to the LNA 716. A vertical component from OMT 707 (V2) and a horizontal component from OMT 706 (H1) are coupled to the LNA 717. The LNAs 716, 717 are coupled to additional radiometer circuitry that is not shown in FIG. 7.

Figure 8:
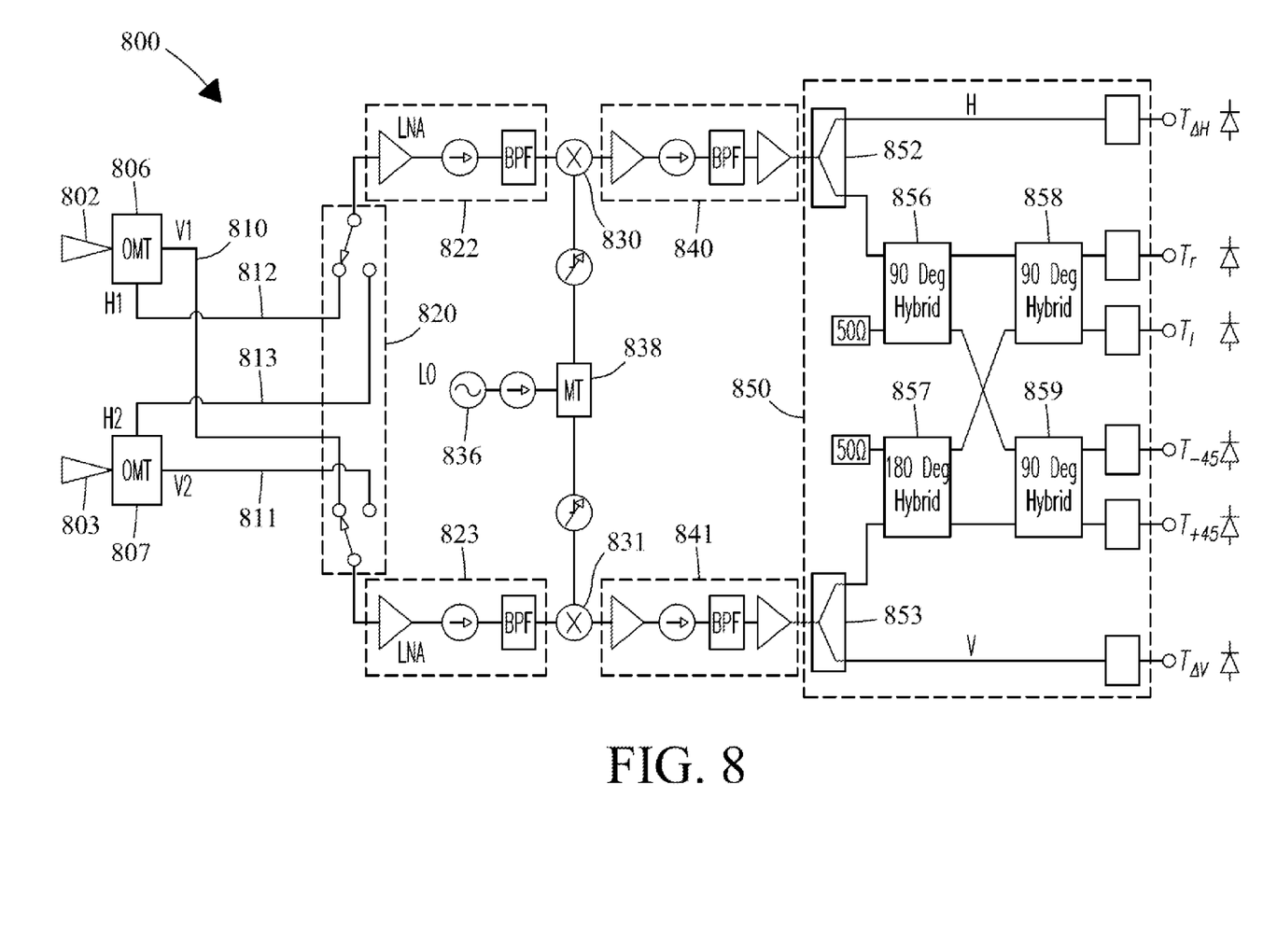
FIG. 8 illustrates a differential radiometer having polarization dependent outputs corresponding to linear and circular states of polarization that includes a Dicke switch configured to alternately direct polarization components from different antenna horns to respective amplifier systems.

Radiation directed to the detector horn can be detected with various radiometer configurations. As shown in FIG. 8, a differential radiometer 800 includes first and second detector horns 802, 803 that are coupled to respective orthomode transducers (OMTs) 806, 807. The detector horns 802, 803 are typically situated along displaced axes as illustrated, and an imaging system is configured to direct radiation associated with one or more object patches to the horns 802, 803. The OMTs 806, 807 direct horizontal and vertical components of the received electrical fields to respective horizontal (H) outputs 812, 813 and vertical (V) outputs 810, 811. Horizontal field components from the orthomode transducers 802, 803 are alternately directed to low noise amplifier/circulator/bandpass filter/amplifier system 822 with a Dicke switch 820. Similarly, vertical field components from the orthomode transducers 802, 803 are alternately directed to low noise amplifier/circulator/bandpass filter amplifier system 823 by the Dicke switch 820. Outputs from the amplifier systems 822, 823 are coupled to respective mixers 830, 831 that receive a local oscillator signal from a so-called "magic tee" 838 that is coupled to a local oscillator 836. While a magic tee is used to couple local oscillator signals in FIG. 8, other couplers can be used. The combinations of the local oscillator signal and the detected H and V signals are coupled to respective bandpass amplifier systems 840, 841 that are configured to couple signal components at or near frequency differences between the detected H and V signals, and attenuate sum frequencies. Thus, the mixers 830, 831 and the amplifier systems 840, 841 form a heterodyne system that provides H and V components of the detected radiation shifted to a lower frequency based on a difference between the detected radiation and the local oscillator.

A polarization detection module 850 receives the down mixed H and V signals at respective power splitters 852, 853 that coupled the down mixed signals to 90 degree hybrids 856, 858 and 180 degree hybrids 857, 859. The module 850 has outputs corresponding to differences of horizontal linear, right circular, left circular, −45 degree linear, +45 degree linear, and vertical linear SOP between radiation received at the horns 802, 803.

Figure 9:
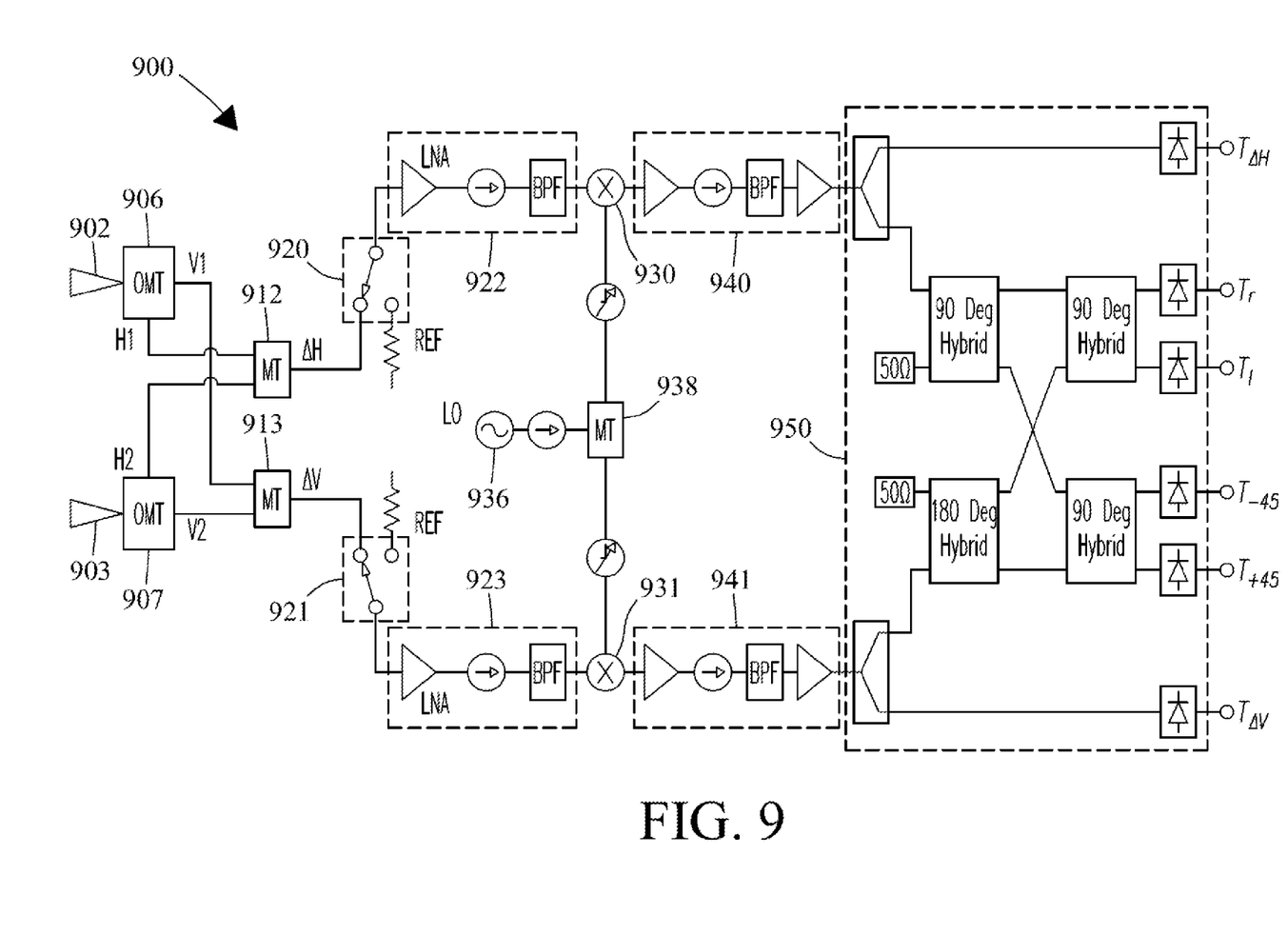
FIG. 9 illustrates a differential radiometer having polarization dependent outputs corresponding to linear and circular states of polarization that includes a magic tee situated to direct signals to respective amplifier systems based on polarization differences at antennas horns.

In the example of FIG. 8, polarization differences between radiation received at the horns 802, 803 are produced by switching the H and V components input to each of the amplifier systems 822, 823. However, differences can be produced without such switching. Referring to FIG. 9, a differential radiometer 900 includes first and second detector horns 902, 903 that are coupled to respective orthomode transducers (OMTs) 906, 907. The detector horns 902, 903 are typically situated along displaced axes as illustrated, and an imaging system is configured to direct radiation associated with one or more object patches to the horns 902, 903. The orthomode transducers 906, 907 are coupled to direct horizontal and vertical components of the received electrical fields to respective magic tees 912, 913 so as to produce electrical signals based on differences between the H and the V electrical field components, respectively. These difference signals (shown in FIG. 9 as ΔH, ΔV) and a passive reference load (REF) are alternately coupled to low noise amplifier/circulator/bandpass filter/amplifier systems 922, 923 with respective Dicke switches 920, 921.

Outputs from the amplifier systems 922, 923 are coupled to respective mixers 930, 931 that receive a local oscillator signal from a magic tee 938 that is coupled to a local oscillator 936. The combinations of the local oscillator signal and the detected ΔH and ΔV signals are coupled to respective bandpass amplifier systems 940, 941 that are configured to couple signal components at or near frequency differences between the detected ΔH, ΔV signals and the local oscillator, and attenuate sum frequencies. Thus, the mixers 930, 931 and the amplifier systems 940, 941 form a heterodyne system that provides electrical signals associated with H and V components of the detected radiation but shifted to a lower frequency based on a difference frequency between the frequency of the detected radiation and the local oscillator frequency. A polarization detection module 950 similar to that of FIG. 8 receives the down mixed ΔH and ΔV signals and has signal outputs corresponding to differences of horizontal linear ($T_{\Delta H}$), right circular ($T_{\Delta R}$), left circular ($T_{\Delta L}$), −45 linear ($T_{\Delta -45}$), +45 degree linear ($T_{\Delta +45}$), and vertical linear ($T_{\Delta V}$) SOPs between radiation received at the horns 902, 903.

In the examples of FIGS. 8-9, the Dicke switches are implemented with PIN diodes and the orthogonal polarization components (H, V) or the orthogonal polarization differences (ΔH, ΔV) are heterodyned with a local oscillator having a local oscillator frequency of about 87 GHz and bandpass filtered to produce a heterodyne signal at a 6 GHz center frequency having a 2 GHz bandwidth. Other frequency ranges can be used, and a local oscillator frequency can be selected to produce a homodyne output signal. The examples above are generally based on so-called polarization combining radiometers, but in other examples correlation radiometers or other types of radiometers can be used. In addition, in the examples of FIGS. 8-9, radiometers provide outputs at each of the six outputs at the same time. In other examples, polarization component outputs can be switched.

Figure 10:
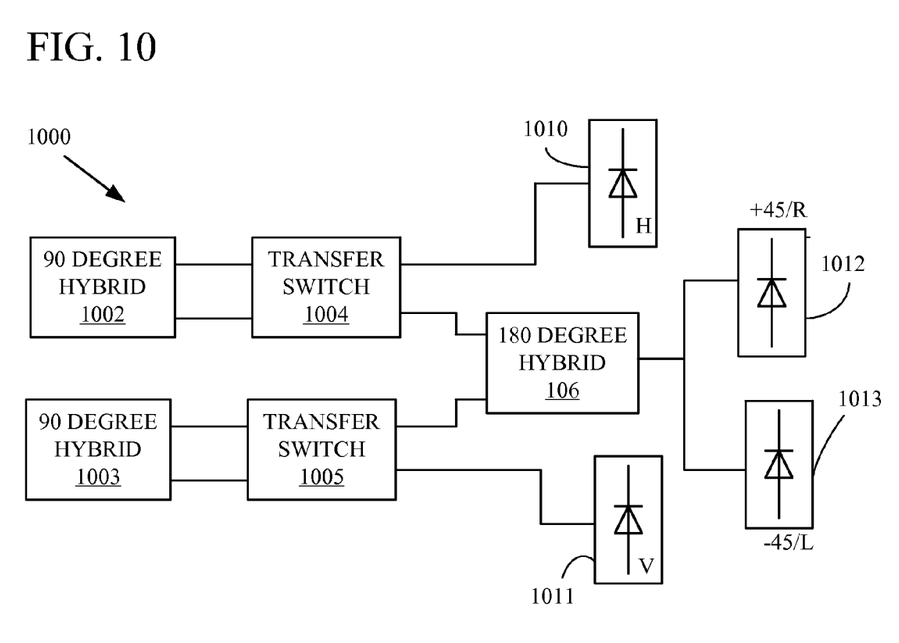
FIG. 10 is a schematic diagram of an alternative polarization detection module.

With reference to FIG. 10, an alternative polarization module 1000 comprises first and second 90 degree hybrids 1002, 1003 configured to receive inputs corresponding to H and V SOPs, respectively. Detectors 1010, 1011 produce outputs corresponding to ΔH, ΔV, respectively. The 90 degree hybrids 1002, 1003 are coupled to respective transfer switches 1004, 1005 and to a 180 degree hybrid 1006. Based on the state of the transfer switches, detectors 1012, 1013 produce outputs corresponding to H, V, right, left, diagonal, and anti-diagonal SOPs. Thus, the module 1000 can produce the six outputs needed to determine all Stokes parameters.

EXAMPLE I

Polarization Contrast

Figure 11:
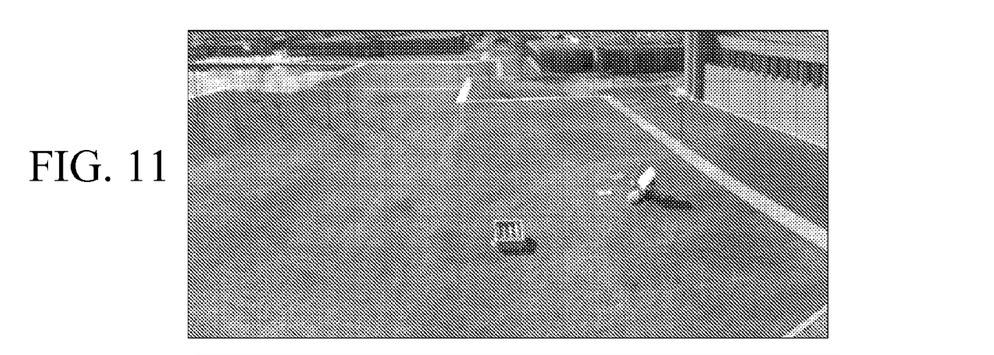
FIG. 11 is a visible light image of a representative scene.
Figure 12:
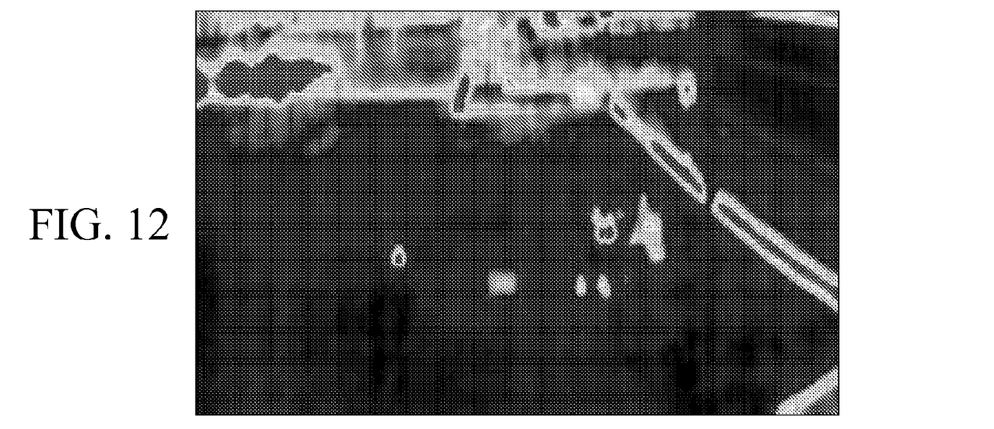
FIG. 12 is MMW intensity image corresponding to FIG. 11.
Figure 13:
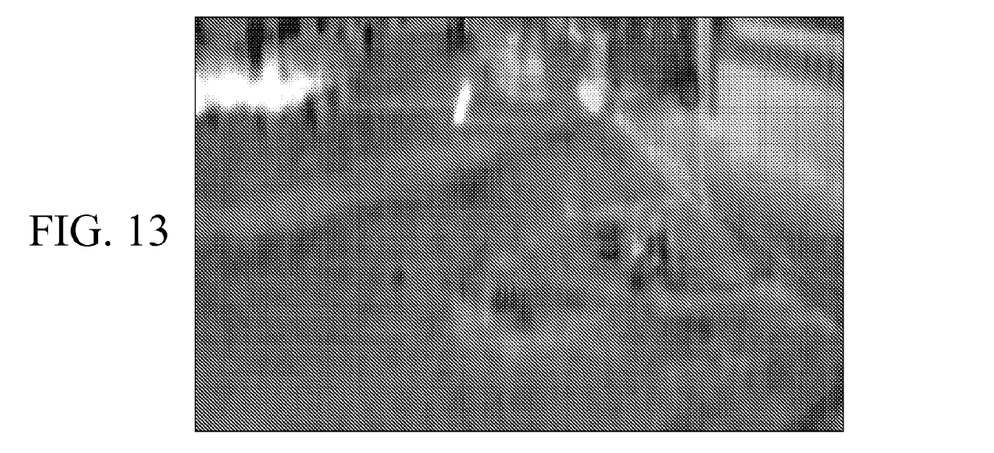
FIG. 13 is a gray scale representation of a pseudocolor MMW image of the scene of FIG. 11 in which Stokes Q, U, and V images are mapped to red, green, and blue display colors.

A passive polarimetric MWW imaging system was constructed to permit formation of various polarimetric images. FIG. 11 is a visible light image of a representative scene that includes metallic pipes in a sample box, and FIG. 12 is a millimeter wave intensity image of the same scene. The metallic pipes visible in FIG. 11 are not apparent in FIG. 12. FIG. 13 is an intensity (gray-scale) representation of a pseudocolor mapping in which Stokes Q, U, and V images are mapped into red, green, and blue as displayed. The pipes shown in FIG. 11 can be seen, and additional disturbances in a grass are around the box are also apparent, primarily due to the U-based image. Other color mappings are possible, and FIG. 13 is provided only as a representative example.

EXAMPLE II

Differential Polarization Contrast

Center-to-Center (CTC) spacing of imaged spots can be configured to match the CTC of the antenna horns at the image plane. To produce a millimeter wave phase contrast or differential image, two object patches separated by about the resolution of the system or less are preferably coupled into antenna horns having a fixed spacing. For example, for the ellipsoidal reflector imaging system of Example I (object space resolution 39.04 mm) an effective antenna horn separation of 7.7 mm corresponds to a diffraction limited separation. This effective separation distance can be provided by inserting a negative focal length lens in the image side optics, but such a lens can modify the optical system F/# and hence system resolution. Alternatively, negative refractive axicon surface can be situated near a focal plane. A negative axicon that includes a negative spherical refractive lens surface is illustrate above in FIG. 2A, and has a convex conical surface of revolution. Such a negative axicon can be situated so as to provide a selected displacement of bundles of incoming rays from two spatially distinct object points so that the bundles diverge into respective antenna horns.

A radiometer similar to that shown in FIG. 8 was constructed to obtain differential interference contrast millimeter wave polarimetric images. Two input antenna horns were situated at a center-to-center (CTC) spacing of about 23.98 mm, and an elliptic reflector of aperture 500 mm was configured to provide a demagnification of 1:5 for an object distance of 5 m. With this configuration, two object patches separated by 122 mm were imaged into different horns.

Figure 14:
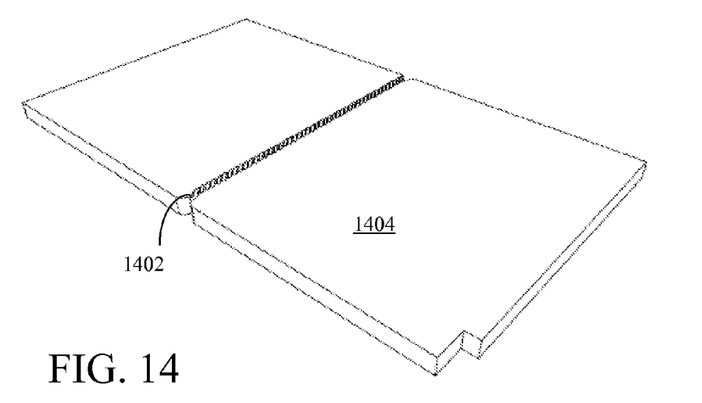
FIG. 14 illustrates a representative imaging sample.
Figure 15:
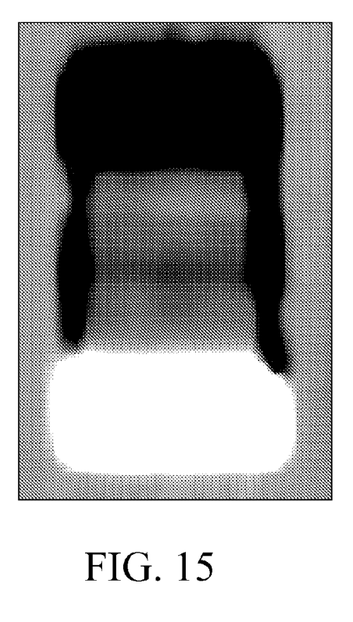
FIGS. 15-16 are Stokes I and V images, respectively, of the sample of FIG. 14.
Figure 16:
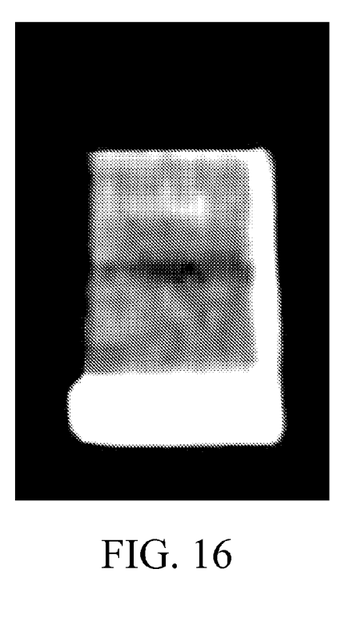
Figure 17A:
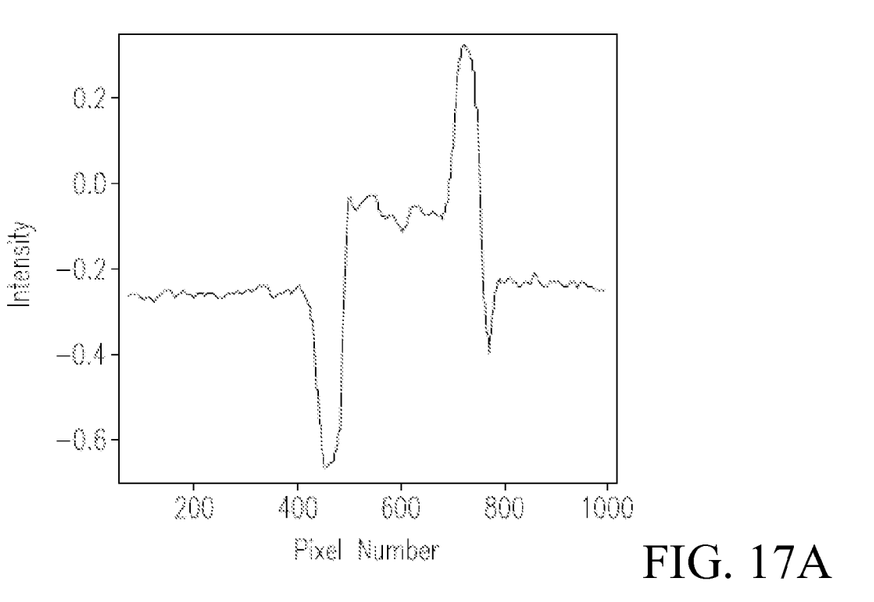
FIGS. 17A-17B are graphs corresponding to vertical intensity slices of the image of FIG. 16.
Figure 17B:
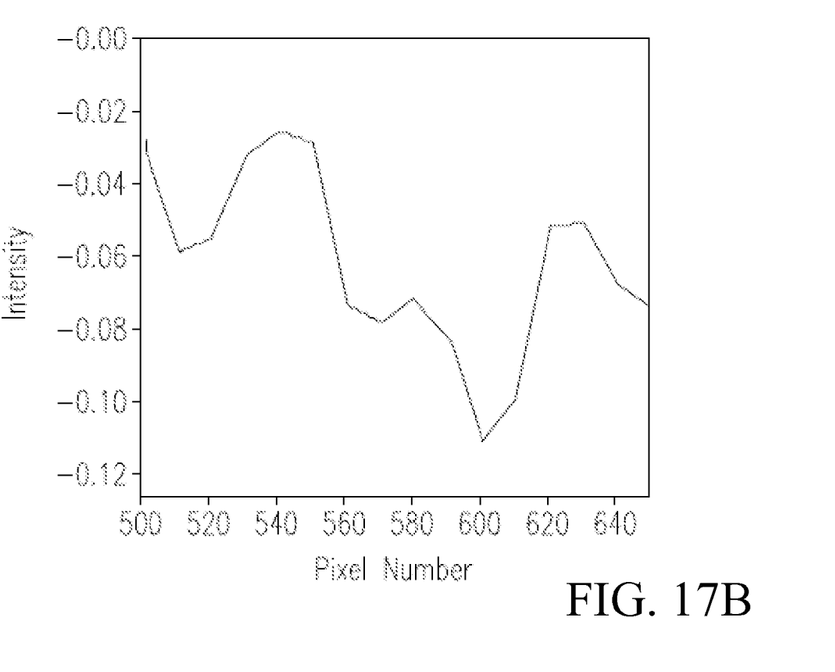

The radiometer was mounted at the focal plane of an elliptical reflector and used to image a sample object shown in FIG. 14. A wire twisted pair 1402 (18 gauge wire, 1 mm diameter) is situated against a radar absorbing material (RAM) 1404. FIGS. 15-16 are a Stokes I (intensity) image and a Stokes V (elliptical polarization) image, respectively, at an image demagnification of 0.5. FIGS. 17A-17B are vertical intensity slices through a V Stokes image corresponding to a full image, and a section of the full image, respectively. Both images show the two opposite-phase images of the wire produced by differential imaging.

EXAMPLE III

Differential Polarization Contrast I with Compensated Horn Spacing

The CTC spacing of images of object patches can be configured to match the CTC of the antenna horns at the image plane. Two object patches separated by about the resolution of an imaging system or less are preferably coupled into antenna horns having a fixed spacing. For example, for the ellipsoidal reflector imaging system of Example I, the resolution of the imaging system at a wavelength of about 3.2 mm is approximately:

$$1.22 \cdot \frac{\lambda}{D} \cdot d_{obj} = 1.22 \cdot \frac{3.2}{500} \cdot 5000 = 39.04 \text{ mm}$$

at the object plane, requiring a horn center-to-center spacing of 7.7 mm, not the actual 23.98 mm spacing. The effective optical CTC spacing can be adjusted with a negative focal length lens in the image side optics, but such a lens can modify the optical system F/# and hence system resolution. Alternatively, a negative refractive axicon surface that includes a negative spherical refractive lens surface such as illustrated in FIG. 2A can be situated near a focal plane. Such a negative axicon can be situated and selected so as to provide a selected displacement of incoming rays bundles from two spatially distinct object points so that the bundles diverge into respective antenna horns.

Figure 18:
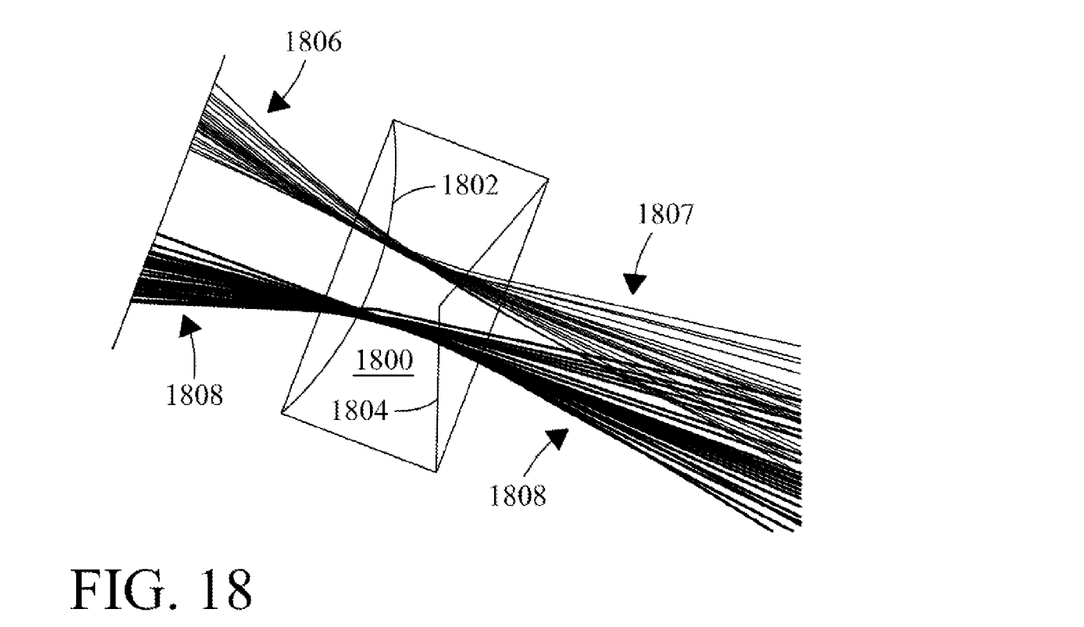
FIG. 18 illustrates ray bundles from two object patches propagating through an axicon.
Figure 19:
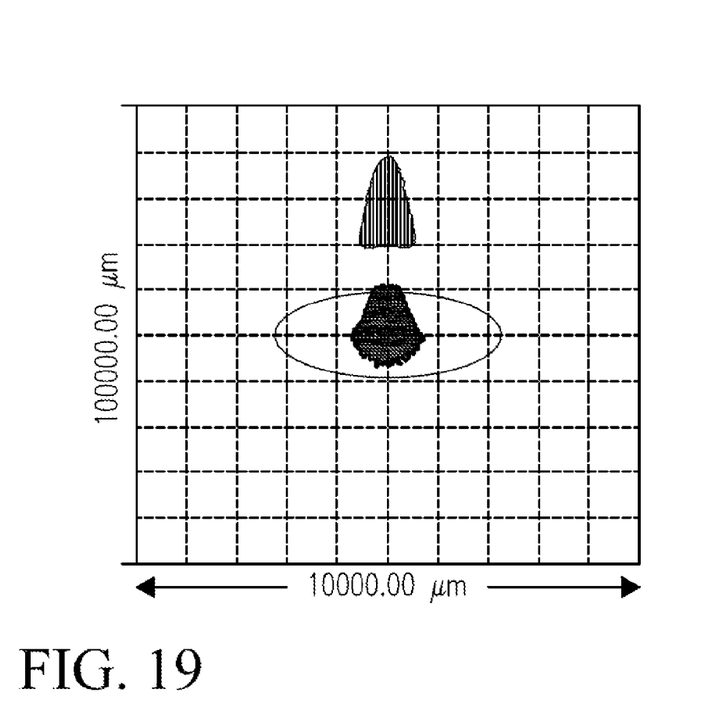
FIG. 19 is a spot diagram associated with the ray bundles of FIG. 18.

Referring to FIG. 18, a negative axicon 1800 includes a negative (concave) spherical surface 1802 and a negative (concave) conical surface 1804. Ray bundles 1806, 1808 from different object patches are incident to the axicon 1800 and are diverged into ray bundles 1807, 1808 that have a spacing selected to correspond to an antenna horn spacing. FIG. 19 is a spot diagram showing two focused spots corresponding to object points separated by 46 mm and imaged at an image plane with a separation of about 24 mm so as to couple into antenna horns having a 24 mm CTC spacing.

Figure 20:
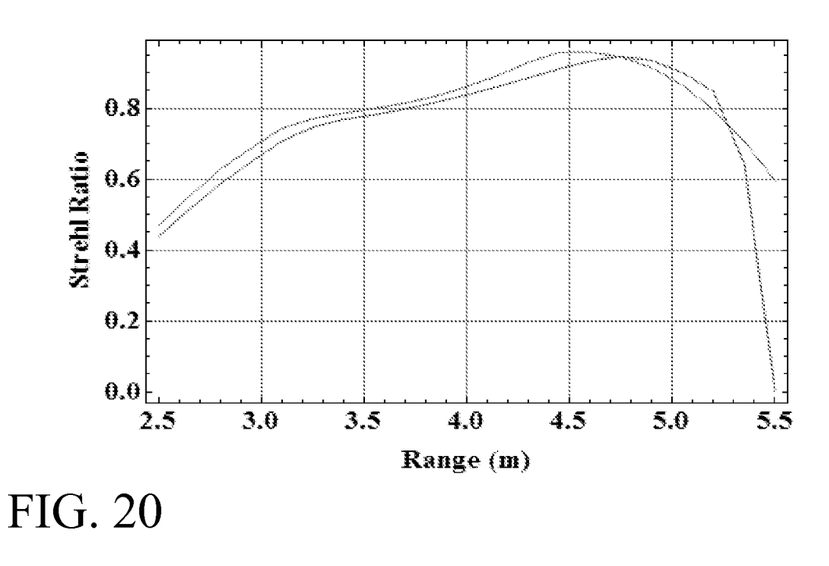
FIG. 20 is a graph of Strehl ratio for a differential polarimetric imager that includes an axicon such as that of FIG. 18.

The negative lens surface on the exit surface of the axicon tends to preserve system F/# and reduce overall system length. This lens surface produces only a small change in working distance and F/#. FIG. 20 is a graph of Strehl Ratio is calculated as a function of distance to target. Strehl Ratio is a figure of merit that compares the on axis intensity of a system's point spread function when the system has no aberrations to the physical or "as built" system. The threshold for diffraction limited performance is represented by a Strehl Ratio of 0.8.

Figure 21:
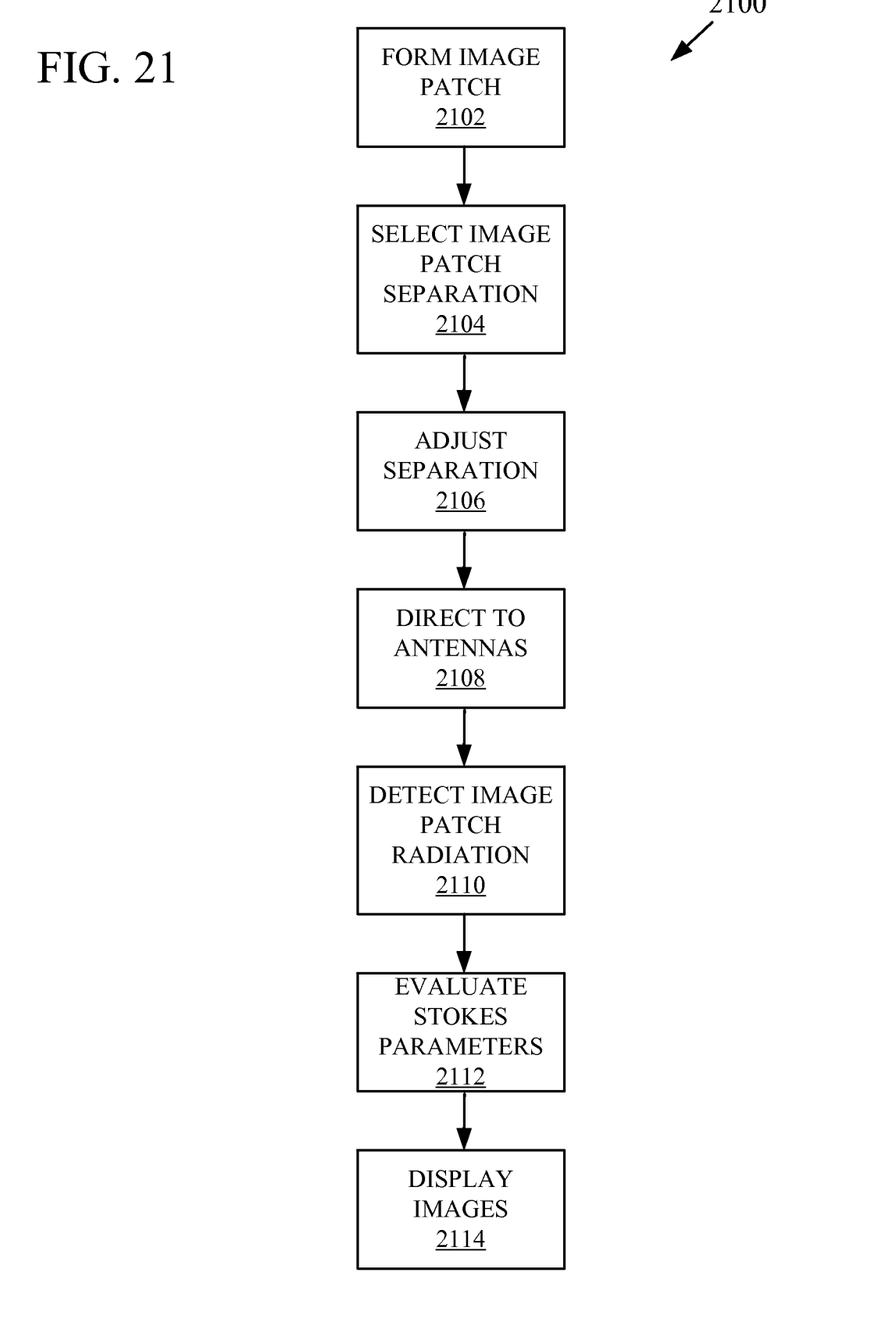
FIG. 21 is a block diagram of a method of obtaining a differential polarimetric image based on adjustment of an effective antenna separation.

With reference to FIG. 21, a method of obtaining a differential polarization image 2100 comprises directing radiation from a first object patch and a second object patch so as to form respective image patches at 2102. Typically, an image patch separation is selected based on an imaging system diffraction limit at 2104, and the selected image patch separation is adjusted using an axicon or other optical element at 2106 so as to conform to an antenna spacing. Radiation from the image patches is directed to respective antennas at 2108.

Signals associated with the states of polarization of the received radiation from the image patches are produced at 2110, and differences between the signals are obtained at 2112. Based on the difference signals, one or more images based on a polarization difference, such as a difference in one or more Stokes parameters are displayed at 2114.

In view of the many possible embodiments to which the principles of the disclosed technology may be applied, it should be recognized that the illustrated embodiments are only preferred examples and should not be taken as limiting. Rather, the scope of the invention is defined by the following claims. We therefore claim as our invention all that comes within the scope and spirit of these claims.

We claim:

1. An apparatus, comprising:
    an imaging element situated on an axis and configured to produce an image having at least a first image patch and a second image patch based on a first object patch and a second object patch, respectively;
    a first antenna and a second antenna situated along the axis to receive radiation associated with the first image patch and the second image patch, respectively, wherein at least one of the first antenna and the second antenna are displaced from the axis; and
    a radiometer coupled to the first antenna and the second antenna and configured to provide an output signal based on a least one polarization difference between the radiation associated with the first image patch and the second image patch.

2. The apparatus of claim 1, wherein the radiometer includes a switch configured to receive field components associated with a first state of polarization and a second state of polarization at the first antenna and the second antenna, and provide the output signal based on alternatingly coupling field components associated with the first state of polarization at the first antenna and the second antenna to a first bandpass amplifier, and alternatingly coupling field components associated with the second state of polarization at the first antenna and the second antenna to a second bandpass amplifier.

3. The apparatus of claim 1, further comprising first and second combiners configured to receive field components associated with a first state of polarization at the first antenna and the second antenna and a second state of polarization at the first antenna and the second antenna, respectively, and provide difference signals to the radiometer corresponding to a difference between the field components associated with the first state of polarization and the field components associated with the second state of polarization.

4. The apparatus of claim 3, further comprising:
    a first bandpass amplifier and a second bandpass amplifier; and
    a switch configured to alternatingly couple the difference signal corresponding to the difference between the field components associated with the first state of polarization and a first reference signal, and the difference signal corresponding to the difference between the field components associated with the second state of polarization and a second reference signal to the first bandpass amplifier and the second band pass amplifier, respectively.

5. The apparatus of claim 1, further comprising a memory configured to store the at least one polarization difference associated with a plurality of first and second image patches so as to define an at least one dimensional image.

6. The apparatus of claim 5, further comprising a shear element configured to displace the radiation associated with the first image patch and the radiation associated with the second image patch with respect to the axis, and direct the displaced radiation to respective antennas.

7. The apparatus of claim 6, wherein the shear element is configured to provide the displacement of the radiation associated with the first image patch and the radiation associated with the second image patch based on an imaging element diffraction limit.

8. The apparatus of claim 7, wherein the shear element is an axicon having a surface of rotation configured to increase a displacement of the first and second image patches with respect to the axis.

9. The apparatus of claim 7, wherein the shear element is an axicon having a surface of rotation configured to decrease a displacement of the first and second image patches with respect to the axis.

10. The apparatus of claim 7, wherein the polarization difference is associated with at least one linear state of polarization or at least one circular state of polarization.

11. The apparatus of claim 6, wherein the displacement of the radiation associated with the first image patch and the radiation associated with the second image patch is based on a separation of the first antenna and the second antenna.

12. The apparatus of claim 6, wherein the shear element is an axicon.

13. The apparatus of claim 12, wherein the axicon has a conical surface and a negative lens surface.

14. The apparatus of claim 1, wherein the first and second antennas are horns.

15. The apparatus of claim 1, wherein the first antenna and the second antenna are situated along offset axes.

16. The apparatus of claim 15, wherein the offset axes are parallel.

17. The apparatus of claim 1, wherein the imaging element is associated with an aperture stop having an effective diameter D, the radiometer is responsive to radiation at a wavelength $\lambda$, and the first object patch and the second object patch have an angular separation of less than about $1.5\ \lambda/D$.

18. The apparatus of claim 1, wherein the polarization difference is at least one difference between at least one Stokes parameter associated with the first and second object patches.

19. A method, comprising:
    receiving a first radiation flux from a first object patch and a second radiation flux from a second object patch;
    directing the first radiation flux and the second radiation flux along first and second axes to first and second antennas, respectively; and
    based on the radiation fluxes received at the first and second antennas, determining at least one polarization difference between the first object patch and the second object patch.

20. The method of claim 19, wherein the first object patch and the second object patch have an angular separation that is less than or equal to an effective diffraction limited angular separation.

21. The method of claim 19, wherein the first and second axes are offset parallel axes.

22. The method of claim 21, further comprising displacing at least portions of the first radiation flux and the second radiation flux so as to propagate along first and second offset parallel axes so as to be received by the first antenna and the second antenna, respectively.

23. The method of claim 22, wherein the displacement is associated with an increased separation of the first radiation flux and the second radiation flux.

24. The method of claim 22, wherein the displacement is associated with an increased separation of the first radiation flux and the second radiation flux.

25. The method of claim 19, further comprising determining at least one Stokes parameter difference based on the at least one polarization characteristic.

26. The method of claim 19, further comprising:
receiving a first radiation flux from a plurality of first object patches and a second radiation flux from a plurality of second object patches;
directing the first radiation flux and the second radiation flux from the plurality of object patches along first and second offset axes to first and second antennas, respectively; and
based on the radiation fluxes received at the first and second antennas, determining polarization differences between the first object patches and the second object patches of the plurality of object patches; and
forming an image based on the plurality of polarization differences.

27. A millimeter wave imaging system, comprising:
a mirror defining an aperture stop of diameter D and situated so as to form an image of an object;
an axicon situated to displace image portions of the image formed by the mirror;
antennas situated configured to receive radiation portions associated with respective displaced image portions; and
a radiometer coupled to the antennas and configured to produce an output corresponding to a polarization difference between the image portions.

28. A method, comprising:
obtaining image patches associated with first and second object patches;
adjusting an image patch separation so as to conform to an antenna spacing; and
directing radiation associated with the first and second image patches to a first and a second antenna, respectively; and
based on the directed radiation, determining at least one polarization difference between the first image patch and the second image patch.

29. The method of claim 28, wherein the image patch separation corresponds to a diffraction limit.

30. The method of claim 28, wherein the optical radiation is at a wavelength $\lambda$, the object patches are imaged with an imaging element having an effective diameter D, and an angular separation of the first and second object patches with respect to the imaging element is less than $1.2\,\lambda/D$.

31. The method of claim 28, further comprising detecting the radiation from the first image patch and the second image patch with a differential radiometer.

32. The method of claim 28, further comprising detecting the at least one polarization difference based on frequency downconverted electrical signals associated with the radiation from the first image patch and the second image patch.

* * * * *